United States Patent [19]

Sinquin et al.

[11] Patent Number: 5,138,958
[45] Date of Patent: Aug. 18, 1992

[54] PROCESS FOR INCINERATING DOMESTIC REFUSE IN A FLUIDIZED BED FURNACE

[75] Inventors: Roger Sinquin, Paris; Alexandre Petrovic, Chatou, both of France

[73] Assignee: Compagnie General De Chauffe, Saint-Andre, France

[21] Appl. No.: 786,724

[22] Filed: Nov. 1, 1991

[30] Foreign Application Priority Data

Nov. 2, 1990 [FR] France .................. 90 13626

[51] Int. Cl.$^5$ ............................................ F23G 5/00
[52] U.S. Cl. .................................. 110/346; 110/245;
110/345; 122/4 D
[58] Field of Search ............... 110/346, 347, 345, 245,
110/344; 122/4 D

[56] References Cited

U.S. PATENT DOCUMENTS

| | | | |
|---|---|---|---|
| 4,422,410 | 12/1983 | Lake et al. .......................... | 122/4 D |
| 4,913,097 | 4/1990 | Derksen et al. ..................... | 122/4 D |

FOREIGN PATENT DOCUMENTS

| | | |
|---|---|---|
| 0005965 | 12/1979 | European Pat. Off. . |
| 0238048 | 9/1987 | European Pat. Off. . |
| 0358760 | 3/1990 | European Pat. Off. . |
| 0388284 | 9/1990 | European Pat. Off. . |
| 3702089 | 6/1988 | Fed. Rep. of Germany . |
| 2583305 | 12/1986 | France . |
| 453777 | 2/1988 | Sweden . |

*Primary Examiner*—Edward G. Favors
*Attorney, Agent, or Firm*—Perry Carvellas

[57] ABSTRACT

A process for incinerating domestic refuse is implemented in a boiler comprising a fluidized bed furnace over which is a post-combustion chamber. The smoke passes through alternately upward and downward paths in which it is cooled in contact with walls provided with water tubes. Limestone is injected into the bed to fix the sulfur oxides and halogenated compounds and a jet of powdered lime is injected at the start of the third path to neutralize the remaining halogenated compounds; the flying particles deposited are recycled into the furnace. The temperature of the bed is held between 800° C. and 900° C. and the injection of secondary air is adjusted to obtain an oxygen concentration in the smoke between 5.5% and 7.5% to minimize the formation of nitrogen oxides, dioxins and furans.

9 Claims, 1 Drawing Sheet

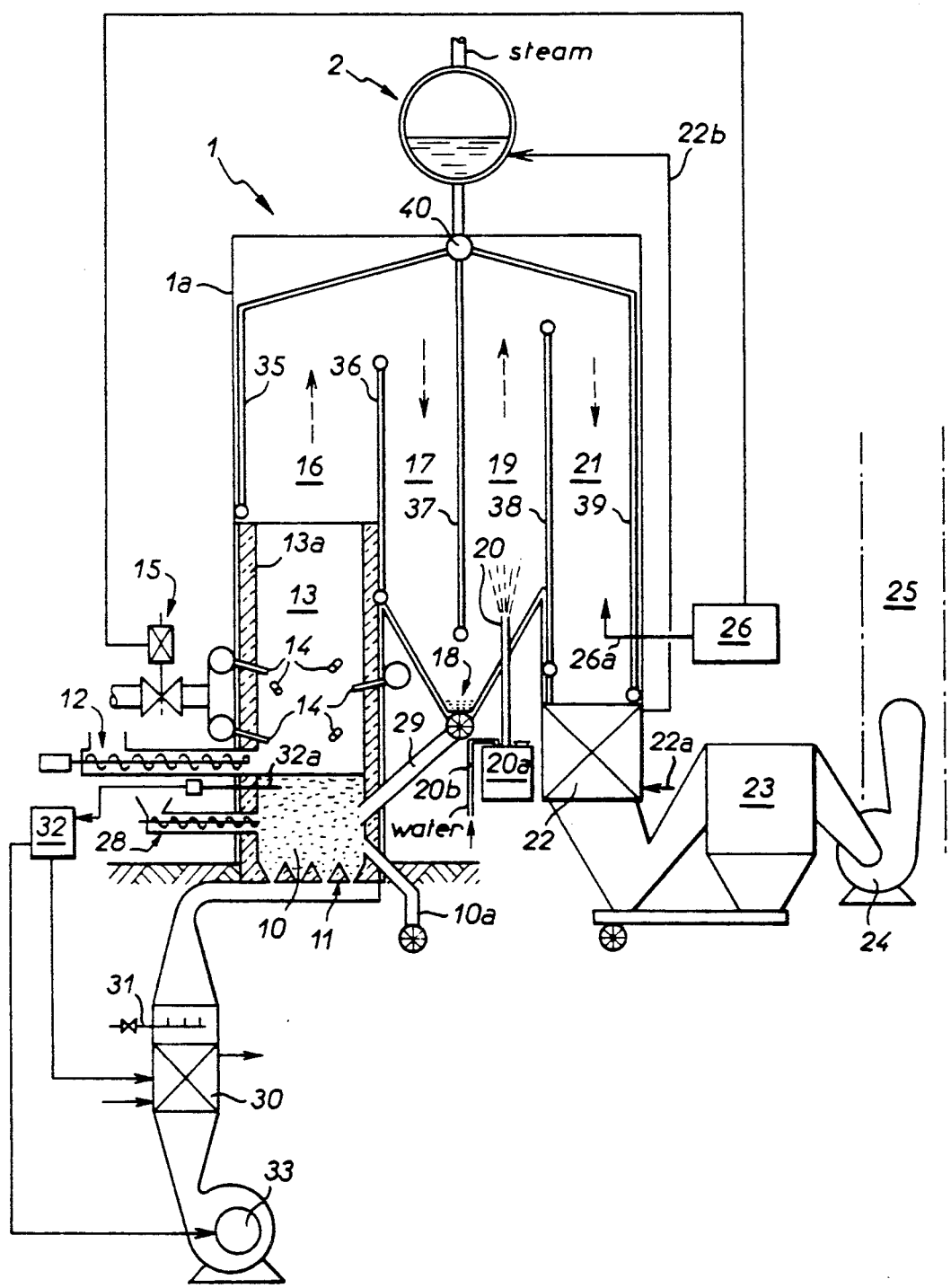

PROCESS FOR INCINERATING DOMESTIC REFUSE IN A FLUIDIZED BED FURNACE

The invention concerns a process for incinerating domestic refuse or the like with intrinsic cleaning of the smoke in which the refuse previously broken down to an appropriate particle size is introduced into a dense fluidized bed furnace fed with primary combustion-supporting air from below in which the fixed parts burn and the volatile parts are released comprising, along with combustible gases, pollutants such as sulfur oxides and halogenated gases in particular and entrained solid particles; secondary combustion-supporting air is injected into a post-combustion chamber above the fluidized bed furnace in which said combustible gases burn to form smoke, and the thermal energy of the smoke is recovered in a boiler with walls provided with water tubes divided by baffles into successive alternately upward and downward vertical paths, the upward first path extending the post-combustion chamber.

Generally speaking, to prevent irreversible damage to the environment the requirements for cleaning smoke from incinerator furnaces are becoming more and more severe. The problem becomes particularly acute in the case of incinerating domestic refuse or the like, such as vegetable or industrial waste, because of variations in its composition, calorific value and moisture content, leading to variations in the operating conditions of the incinerator furnaces and, as a corollary of this, in the composition of the untreated smoke.

The composition of the smoke depends not only on the composition of the fuel but also on the temperatures reached during the various combustion phases and on the rate at which the temperature of the smoke changes. The concentrations of dioxins, furans and nitrogen oxides in the untreated smoke can vary in significant proportions according to the way the temperature changes along the smoke path.

The use of fluidized bed furnaces is increasing in refuse incinerator plant, fluidized bed furnaces enabling much greater flexibility in adjusting the combustion conditions.

Of the various fluidized bed furnaces used, the most interesting are the circulating fluidized bed type, well suited to burning coal. However, dense fluidized bed furnaces have the advantage of virtually complete separation of combustion of the fixed parts of the fuel (carbon and highly pyrolized products), which is virtually totally confined to the fluidized bed, and combustion of the volatile fuel parts which are burned in the presence of secondary air in the post-combustion chamber.

Also, dense fluidized beds are more tolerant of the fuel particle size.

However, although it is possible with dense fluidized bed furnaces to reduce the concentration in the smoke of pollutant products such as nitrogen oxides, carbon monoxide, dioxin and furans formed during combustion because of unfavorable combustion conditions, the same cannot be said for the mass pollutants such as sulfur oxide and halogenated gases, hydrogen chloride and fluoride which are the inevitable result of burning some refuse components and which must be eliminated in any event before the smoke can be dispersed to the atmosphere.

These mass pollutants are essentially manifested by their corrosive nature at low temperatures. Elimination downline, prior to dispersion via the chimney, is ineffective in protecting the downstream parts of the boiler against corrosion. Apart from premature wear of the installation, this reduces the efficiency of energy recovery because of the necessary limitation on cooling of the smoke.

An object of the present invention is a process for incinerating domestic refuse or the like which integrates smoke cleaning into the combustion process and monitors efficiently the combustion conditions and how they change from the furnace to the boiler outlet so that the smoke is virtually free of gas pollutants on leaving the boiler.

To this end, the invention proposes a process for incinerating domestic refuse and the like with intrinsic cleaning of smoke in which the refuse previously broken down to an appropriate particle size is introduced into a dense fluidized bed furnace fed with primary combustion supporting air from below in which the fixed parts burn and the volatile parts are released comprising, along with combustible gases, pollutants such as sulfur oxides and halogenated gases in particular and entrained solid particles; secondary combustion-supporting air is injected into a post-combustion chamber above the fluidized bed furnace in which said combustible gases burn to form smoke; and the thermal energy of the smoke is recovered in a boiler with walls provided with water tubes subdivided by baffles into successive alternately upward and downward vertical paths, the upward first path extending the post-combustion chamber, in which process, the boiler being divided into at least three smoke paths, limestone is introduced into the fluidized bed in at least stoichiometric excess relative to the sulfur-containing compounds, measured as sulfur oxides; powdered lime is injected at the start of the upward third path in quantities at least sufficient to neutralize the halogenated gases; the powder solids are recovered at the lower level between the second and third paths and these powder solids are introduced into the fluidized bed furnace.

The result of introducing limestone into the fluidized bed is to fix as calcium sulfate virtually all of the sulfur oxides which result from combustion of sulfur-containing compounds in the fluidized bed and in the form of calcium chloride and fluoride a non-negligible part of the halogenated gases that would otherwise be released.

Also, the temperature of the post-combustion chamber and the air entry conditions can be adjusted to minimize the formation of nitrogen oxides, dioxins and furans while the length of the successive paths in the boiler produces regular cooling of the smoke which significantly reduces the concentration in the smoke of metastable endothermic substances.

The injection of lime at the start of the third path provides effective neutralization of any remaining halogenated gases in the smoke, which have reached a temperature particularly appropriate for neutralization.

Finally, the recycling of powder solids from the lower level between the second and third paths results in a particularly low level of unburned material in the ash.

The primary air flowrate and temperature are preferably adjusted in correlation so as to maintain the bed in a predetermined temperature range between 800° C. and 900° C. so that the fixed parts are consumed virtually entirely and the volatile parts can burn efficiently in the post-combustion chamber.

The oxygen content of the smoke is preferably analyzed continuously and the secondary air flowrate adjusted to maintain this concentration between 5.5% and 7.5%. These percentages represent between 40% and 60% overall excess air.

The stoichiometric ratio between the limestone introduced into the bed and the sulfur content of the refuse, measured as sulfur oxides, is preferably between 2.5 and 3, value determined experimentally.

In a preferred embodiment a downward fourth path follows on from the third path to reduce the smoke temperature to a sufficiently low value, which improves the efficiency of the installation.

An exchanger (economizer) is preferably disposed after this fourth path to heat the water supplied to the boiler. In this way the smoke temperature is reduced to around 140° C., at which heavy metals condense. These heavy metals will then be eliminated with the residual dust before the smoke is fed to the chimney.

The injection of lime at the start of the third path will be particularly effective if the injection is effected pneumatically in a carrier air jet directed vertically upwards to achieve a maximum duration of contact between the jet of lime and the smoke ascending in the third path.

Secondary features and the advantages of the invention will emerge from the following description given by way of example with reference to the single appended FIGURE.

This FIGURE is a schematic representation of a boiler with a fluidized bed furnace adapted to implement the method in accordance with the invention.

As shown in the FIGURE, the boiler 1 comprises a general casing 1a which contains a dense fluidized bed furnace 10 over which is a post-combustion chamber 13 followed by four successive vertical smoke paths 16, 17, 19 and 21 which alternate in direction, the first 16 and third 19 paths being upward paths and the second 17 and fourth 21 paths being downward paths.

These path are delimited by walls 35, 36, 37, 38 and 39 forming baffles and incorporating water tubes connected by manifolds 40, etc communicating with a boiler 2. Note that the water tube connections are shown only very schematically and that their actual disposition will be familiar to the man skilled in the art.

After the fourth path 21 the smoke passes through an exchanger (economizer) 22 which receives at 22a the feed water which it heats to around 120° C. The heated feed water is supplied to the boiler 2 through the pipe 22b. The smoke cooled to 140° C. passes through a sleeved dust extractor 23 before it is discharged by a suction fan 24 into the base of a chimney 25.

The fluidized bed 10 is supplied with fluidizing or primary air through a pyramid grate 11, the fluidizing air pumped by a fan 33 reaching the grate 11 after passing through an exchanger 30 supplied with bleed steam to heat this air. Between the exchanger 30 and the grate 11 is an ignitor manifold 31 supplied with natural gas when the fluidized bed furnace is fired up.

After sorting to eliminate most glass, scrap metal and recyclable plastics materials and grinding to ensure that the largest particles do not have a largest dimension exceeding 150 mm the domestic refuse is fed onto the surface of the fluidized bed by a lead screw 12 sealed against escape of smoke. The ash is taken off by a pipe 10a running from the base of the furnace 10.

The walls of the furnace 10 and of the post-combustion chamber 13 over it are lined with a refractory material 13a in the form of silicon carbide bricks. The post-combustion chamber 13 is provided with nozzles 14 fed with secondary air through an adjuster register 15. The nozzles 14 are distributed around the periphery of the post-combustion chamber 13 and oriented to produce strong turbulence so that the combustible gases from the fluidized bed 10 can burn throughout the chamber 13.

Everything described thus far in no way differs fundamentally from conventional arrangements.

According to the invention, the fluidized bed 10 further comprises a lead screw feed device 28 which introduces into the furnace 10 granular limestone, unprocessed limestone from a cementworks, for example, and a feed passage 29 which runs from the hopper-shaped base 18 of the junction between the second and third smoke paths 17 and 19 so that flying particles entrained from the furnace 10 which are deposited in the hopper 18 are returned to the furnace 10 to be combusted completely. Note that the fluidized bed 10 does not comprise any buried exchanger.

A pyrometer device 32a measures the temperature of the fluidized bed continuously and drives the input of a regulator 32 which is able to control the flowrate of primary air supplied by the fan 33 and the temperature at which this primary air is injected, varied by adjustment of the exchanger 30.

In the upper part of the upward third path 19 is a vertical injector 20 which injects into the ascending flow of smoke an upward jet of powdered lime propelled out of a static mixer 20a by compressed air fed in through the pipe 20b.

An oxygen concentration analyzer 26 samples the smoke at the end of the fourth path 21 through a tube 26a and controls the secondary air in that register 15 so as to maintain the oxygen concentration in the smoke between 5.5% and 7.5%, representing between 40% and 50% overall excess combustion-supporting air.

The regulator 32 is adjusted so that the temperature in the fluidized bed is between 800° C. and 900° C., typically 850° C. Given the average composition of domestic waste, typically:

| Lower calorific value LCV | 8 000–13 000 kJ/kg |
| Volatile materials | 65–75% |
| Moisture content | 25–35% |
| Ash | 10–25% | the operating conditions are substantially as follows:

| Primary/secondary air volume ratio | 40/60 approx |
|---|---|
| Fluidizing speed | 1–1.5 m/s |
| Smoke velocity in post-combustion chamber | 3.5–4.5 m/s |
| Temperature at surface of refractory 13a | 1 200° C. |
| Temperature at exit from first path | 900° C. |
| Time at temperatures above 850° C. | 2.5–3.5 s |
| Smoke temperature at junction between 2nd and 3rd paths 17 and 19 | 500–600° C. |
| Smoke temperature at inlet of economizer 22 | 350° C. approx |
| Smoke temperature at economizer outlet | 140° C. approx |

The stoichiometric ratio between the limestone injected into the fluidized bed 10 and the sulfur content of the refuse, measured as sulfur oxides $SO_2$ and $SO_3$, is between 2.5 and 3. This represents virtually total fixing of the sulfur compounds in the form of calcium sulfate and of some halogenated compounds in the form of calcium chloride and fluoride.

The injection of powdered lime into the smoke at 500°-600° C. in the third path 19 completes the fixing of the halogenated compounds in the form of calcium chloride and fluoride some of which is directed to the furnace 10 by the passage 29 and remainder of which is retained in the dust extractor.

Note that heavy metals are virtually condensed in the smoke cooled to 140° C. and are retained in the sleeve filters of the dust extractor.

These heavy metals may have been vaporized in the smoke either in the element state for metals which sublime at low temperatures or in the volatile compound state.

By virtue of the two-stage combustion of the refuse, the fixed parts in the fluidized bed 10 and the volatile parts in the post-combustion chamber, the limitation of temperature and the combustion smoke cooling conditions, the formation of nitrogen oxides, dioxins and furans is minimized.

Also, by recycling dry ash, the proportion of unburned material in the ash is below 1%.

What is more, because of the low temperature at which the smoke is exhausted and because of the limited volume of the smoke resulting from combustion with low excess air, the energy lost in the smoke is significantly reduced, resulting in a very high thermal efficiency in the order of 88%.

Of course, the invention is not limited to the example described but encompasses any variants of the process within the scope of the claims.

What we claim is :

1. A process for incinerating domestic refuse and the like with intrinsic smoke cleaning in which the refuse previously broken down to an appropriate particle size is introduced into a dense fluidized bed fed with primary combustion supporting air from below in which the fixed parts burn and the volatile parts are released comprising, along with combustible gases, pollutants such as sulfur oxides and halogenated gases in particular and entrained solid particles; secondary combustion-supporting air is injected into a post-combustion chamber over the fluidized bed furnace in which said combustible gases burn to form smoke; and the thermal energy of the smoke is recovered in a boiler with walls provided with water tubes subdivided by baffles into successive alternately upward and downward vertical paths, the upward first path extending the post-combustion chamber, in which process, the boiler being divided into at least three smoke paths, limestone is introduced into the fluidized bed in at least stoichiometric excess relative to the sulfur-containing compounds, measured as sulfur oxides; powdered lime is injected at the start of the upward third path in quantities at least sufficient to neutralize the halogenated gases; powder solids are recovered at the lower level between the second and third paths and these powder solids are introduced into the fluidized bed furnace.

2. Process according to claim 1 wherein the temperature and the flowrate of the primary air are adjusted correlatively to maintain the fluidized bed in a predetermined temperature range.

3. Process according to claim 2 wherein said predetermined temperature range is between 800° C. and 900° C.

4. Process according to claim 1 in which the oxygen content of the smoke is analyzed continuously and the secondary air flowrate is adjusted to maintain this concentration at between 5.5% and 7.5% approx.

5. Process according to claim 1 wherein the stoichiometric ratio between the limestone injected into the bed and the sulfur content of the refuse, measured as sulfur oxides, is between 2.5 and 3.

6. Process according to claim 1 wherein a downward fourth smoke path follows on from the third path.

7. Process according to claim 6 wherein the smoke is cooled at the outlet from the fourth path to approximately 140° C. by passing it through an exchanger (economizer) supplying water to the boiler.

8. Process according to claim 7 wherein dust is extracted from the smoke between the economizer and a chimney for dispersing it into the atmosphere.

9. Process according to claim 1 in which the lime is injected in a vertically upwards direction by pneumatic means at the start of the third path.

* * * * *